United States Patent Office 2,812,475
Patented Nov. 5, 1957

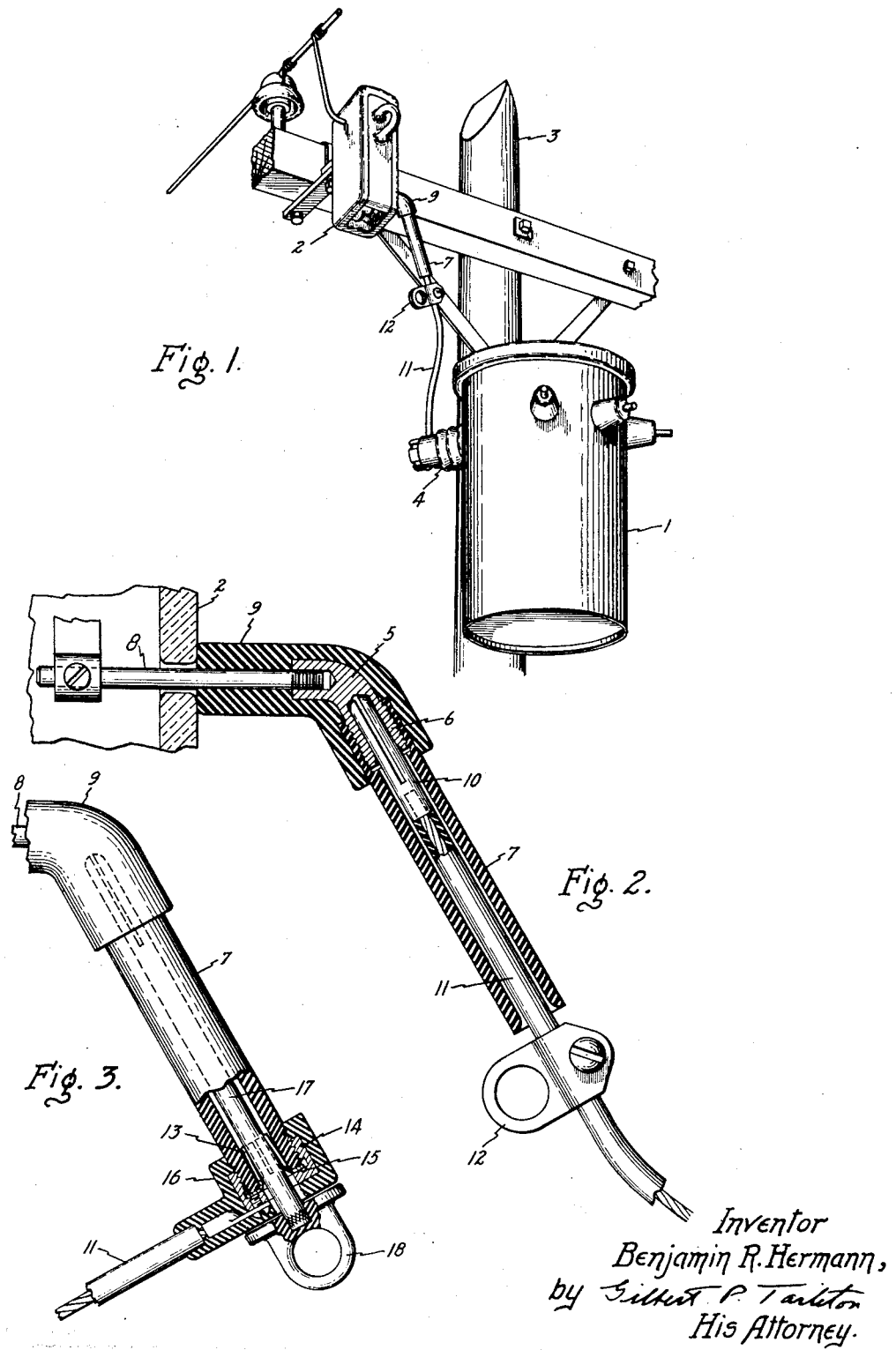

2,812,475
LOAD BREAK DEVICE

Benjamin R. Hermann, Pittsfield, Mass., assignor to General Electric Company, a corporation of New York Application May 5, 1954, Serial No. 427,716

1 Claim. (Cl. 317—11)

This invention relates to a load break device, and more particularly, to a manually operable series connected plug-in load break device.

In some electrical systems, an electrical apparatus, as a distribution transformer or a section of a line, and an automatically operable circuit interrupting device, as an enclosed fused cutout, are electrically connected in series electrical circuit relationship, said fused cutout protecting said transformer from overcurrents or the like. Said series electrical circuit relationship can be manually broken by opening the door of the fused cutout. However, such a procedure for breaking the load may be accompanied by arcing between the fused cutout contacts. Said arcing is dangerous to the lineman, causes damage to the cutout, and can result in a short circuit.

Accordingly, it is an object of this invention to provide an inexpensive, uncomplicated, reliable, and safe manually operable series connected plug-in load break device.

In one form of my invention a plug-in load break device is provided between a cutout and transformer which are mounted on a line pole in spaced relationship. The plug-in load break device comprises socket and plug-in elements which are surrounded by an electrical insulating material tube which generates electrical arc extinguishing gases for extinguishing an electrical arc which is drawn when the plug-in element is separated from the socket element. The plug-in element can be separated without operating the cutout. The tube is directed in a downward direction and means are provided whereby the plug-in element can be separated by pulling downwardly on a switch stick.

The features of my invention which I believe to be novel are set forth with particularity in the appended claim. My invention itself, however, both as to its organization and method of operation, together with further objects and advantages thereof, may best be understood by reference to the following description taken in connection with the accompanying drawing.

In the drawing, Fig. 1 is a perspective view of one form of my invention. Fig. 2 is an enlarged detailed sectional elevational view of the load break device shown in Fig. 1. Fig. 3 is an elevational view of another form of load break device. Like reference numerals will be used throughout the various figures to indicate identical parts.

Referring now particularly to Fig. 1, shown therein is an electrical system comprising an electrical apparatus or distribution transformer 1 and an automatically operable circuit interrupting device or enclosed fused cutout 2 mounted adjacent each other on an electrical transmission line pole 3. The fused cutout 2 is mounted slightly vertically above the transformer 1, and as will be obvious to those skilled in the art, the fused cutout 2 protects the transformer 1 from overcurrents or the like. Said fused cutout is enclosed within an insulating material housing and has a not shown electrical terminal therein. A not shown aperture formed in the right-hand side wall of said housing is disposed opposite said terminal whereby an electrical line or the like can be electrically connected to said terminal by insertion of said line into said aperture. One form of said fused cutout is shown in my Patent 2,081,813, dated May 25, 1937, and assigned to the same assignee as the instant application.

The transformer 1 has an electrical high voltage winding terminal bushing 4. A manually operable series connected plug-in load break device electrically connects the transformer 1 and fused cutout 2 in series electrical circuit relationship. One end of said load break device plugs into the heretofore mentioned fused cut out aperture and terminal, and the other end of said load break device is connected to transformer terminal 4.

Referring now to Fig. 2, said load break device comprises an elongated cylindrical member 5 bent adjacent a central portion thereof whereby the opposite ends of member 5 are disposed with respect to each other at an obtuse angle. The right-hand end of member 5 has a female or socket contact portion 6 formed therein. Said female or socket portion 6 is positioned within and removably attached to the upper end of an electrical insulating material tubular member 7. Tubular member 7 is adapted to generate an electrical arc extinguishing gas when subjected to an electrical arc, as by construction thereof out of vulcanized rag fiber.

The left-hand end of member 5 has a male contact portion thereon comprising a rod-like member 8 removably connected at its right-hand end to the left-hand end of member 5. The upper end of tubular mmeber 7, the member 5, and the right-hand end of rod-like member 8 are covered by an electrical insulating material 9. The left-hand exposed end of rod-like member 8 plugs into the heretofore mentioned fused cutout aperature and terminal whereby the lower open end of tubular member 7 is directed downwardly, as illustrated in Fig. 1.

Another male contact portion of rod-like member 10 having a length substantially less than the length of tubular member 7 is movable into and out of the tubular member 7 for engagement and disengagement with the female or socket contact portion 6. Rod-like member 10 is split from the upper end thereof towards but short of the lower end thereof whereby when the upper end of the rod-like member 10 is plugged into the female or socket portion 6 it will be self-locked with respect thereto. The split apart upper end portion of rod-like member 10 can be initially pried apart slightly if the bore of the female or socket portion 6 is identical to the outer diameter of rod-like member 10 to insure self-locking engagement of the upper end of rod-like member 10 with the female or socket portion 6.

The upper end of a flexible electrical insulated conductor 11 is electrically connected to the lower end of rod-like member 10, and the lower end of conductor 11 is electrically connected to transformer terminal 4, as illustrated in Fig. 1. A switch-stick hook receiving portion or member 12 is connected to conductor 11 adjacent the upper end thereof. When the hook of a switch-stick is engaged with member 12 and conductor 11 is pulled downwardly, contact members 10 and 5 are disengaged whereby the series electrical circuit relationship of electrical apparatus 1 and automatically operable circuit interrupter 2 is broken. Any arcing attendant to breaking of the load will occur only between contact members 10 and 5. Said arcing will be confined within tubular member 7 and the electrical arc extinguishing gas liberated from tubular member 7 will terminate said arcing. As contact member 10 is withdrawn from tubular member 7, the electrical arc between contacts 10 and 5 is elongated which contributes to extinguishment of said arc. Inasmuch as the electrical arc is confined within electrical insulating material tubular member 7, there is no substantial danger to the safety of a lineman or substantial danger of a short-circuit. Furthermore, since tubular member 7 is removably connected to member 5, when tubular member 7 exceeds its useful life, it can be readily replaced.

In Fig. 3 is shown another form of load break device identical at the upper end thereof to the Fig. 2 form of invention. However, the lower end of the tubular member 7 has an electrical contact thereon. Said contact comprises a funnel-shaped resilient member, the converging end of which has a plurality of axially extending grooves therein to form resilient contact fingers 13. Said funnel-shaped member is connected to the lower end of tubular member 7 by an internally flanged nut 14, the flanged diverging end portion 15 of said funnel-shaped member being clamped between the lower open end of tubular member 7 and the internal end flange of the nut 14. The flexible electrically insulated conductor 11 is connected to the tubular member lower end contact, the exposed portions of said tubular member lower end contact and conductor 11 being covered with electrical insulating material 16. Electrical contact is completed between the not shown female socket 6 of the Fig. 3 form of invention and fingers 13 by a male member 17. Member 17 is metallic and has a length sufficient to span said not shown female socket 6 and the fingers 13. The lower end of member 17 protrudes out of the lower open end of tubular member 7 and has an electrical insulating material eye 18 connected thereto for engagement by a switch stick hook or the like.

While there have been shown and described particular embodiments of the invention, it will be obvious to those skilled in the art that changes and modifications may be made without departing from the invention, and that it is intended by the appended claim to cover all such changes and modifications as come within the true spirit and scope of the invention.

What I claim as new and desire to secure by Letters Patent of the United States is:

In an electrical installation comprising a manually and automatically operable cutout and a transformer which are mounted adjacent to each other on a line pole in spaced relationship, a manually operable plug-in device for manually electrically connecting and disconnecting said cutout and transformer with respect to each other without operation of said cutout, said device comprising a metallic socket element which is electrically connected to said cutout and a metallic plug-in element which is self-locking with respect to said socket element and is adapted for manual connection with and separation from said socket element, a removable electrical insulating material tube which is adapted to generate electrical arc extinguishing gases surrounding said socket and plug-in elements for extinguishing an electrical arc drawn therebetween when said plug-in element is separated from said socket element, said plug-in element being electrically connected to said transformer by an electrical lead, said tube being directed in a downward direction and means on said lead which is adapted to receive a switch stick whereby said plug-in element can be manually separated from said socket element by a downward pull on a switch stick.

References Cited in the file of this patent

UNITED STATES PATENTS

| | | |
|---|---|---|
| 1,576,102 | Downes | Mar. 9, 1926 |
| 2,046,701 | Sandin | July 7, 1936 |
| 2,145,375 | Shultz | Jan. 31, 1939 |
| 2,203,349 | Fox | June 4, 1940 |
| 2,250,165 | Mitschrick | July 22, 1941 |
| 2,268,704 | Emanueli | Jan. 6, 1942 |
| 2,493,347 | Hill | Jan. 3, 1950 |
| 2,663,825 | Amundson | Dec. 22, 1953 |